United States Patent [19]

Frantz

[11] Patent Number: 4,468,239

[45] Date of Patent: Aug. 28, 1984

[54] TWIN TOWER ASSEMBLY FOR DECONTAMINATING COMPRESSED GAS

[75] Inventor: Virgil L. Frantz, Salem, Va.

[73] Assignee: Roanoke College, Salem, Va.

[21] Appl. No.: 456,416

[22] Filed: Jan. 7, 1983

[51] Int. Cl.³ .......................................... B01D 53/04
[52] U.S. Cl. .................................... 55/162; 55/179;
   55/208; 55/316; 55/387; 55/DIG. 17
[58] Field of Search ................. 55/33, 62, 162, 163,
   55/179, 208, 212, 213, 267, 302, 303, 316, 387,
   389, 475, DIG. 17

[56] References Cited

U.S. PATENT DOCUMENTS

| | | | |
|---|---|---|---|
| 3,080,693 | 3/1963 | Glass et al. | 55/163 |
| 3,323,292 | 6/1967 | Brown | 55/163 X |
| 3,324,631 | 6/1967 | Kreuter | 55/163 |
| 3,507,097 | 4/1970 | Crowley et al. | 55/163 X |
| 3,552,096 | 1/1971 | Dayson | 55/163 |
| 3,876,400 | 4/1975 | Frantz | 55/316 X |
| 3,923,479 | 12/1975 | Glass et al. | 55/163 |
| 3,937,622 | 2/1976 | Hewitt et al. | 55/163 |
| 4,029,486 | 6/1977 | Frantz | 55/316 X |
| 4,052,178 | 10/1977 | Frantz | 55/DIG. 17 |
| 4,108,617 | 8/1978 | Frantz | 55/179 X |
| 4,113,451 | 9/1978 | Frantz | 55/162 |
| 4,131,442 | 12/1978 | Frantz | 55/475 X |
| 4,199,331 | 4/1980 | Frantz | 55/179 X |
| 4,261,715 | 4/1981 | Frantz | 55/316 X |
| 4,331,457 | 5/1982 | Morner | 55/179 X |
| 4,336,042 | 6/1982 | Frantz et al. | 55/387 |
| 4,409,005 | 10/1983 | McKendrick | 55/DIG. 17 |

*Primary Examiner*—Robert H. Spitzer
*Attorney, Agent, or Firm*—Wilmer Mechlin

[57] ABSTRACT

A twin tower assembly for decontaminating compressed gas, each tower having inlet, outlet, drain and solenoid valves of which the inlet and drain valves are separately connected directly to the solenoid valve and actuated respectively to close and open by actuating gas supplied and exhausted through the tower's solenoid valve, the towers by alternate energizing of their solenoid valves under timer control and actuation of their inlet and drain valves each normally alternating between decontaminating and regenerating cycles and together alternating in their decontaminating cycles for supplying a continuous output of decontaminated gas, the inlet and drain valves of each tower being so relatively constructed that actuating gas supplied at the same pressure at the solenoid valve exerts a greater force differential for closing the inlet valve than for opening the drain valve and ensures that in cycling the inlet valve will close before opening and open after closing of the drain valve. Passage-connected outlet chambers in the towers enable each tower during a decontaminating cycle to supply decontaminated regenerating gas to the other tower at a flow rate and reduced pressure predetermined by the size of a restricted orifice in the connecting passage and each tower removably houses in advance of its outlet chamber a canister containing and shippable loaded with a particulate desiccant and mounting upstream of the desiccant an oil coalescer.

18 Claims, 6 Drawing Figures

TWIN TOWER ASSEMBLY FOR DECONTAMINATING COMPRESSED GAS

BACKGROUND OF THE INVENTION

The closest prior approaches to the assembly of the present invention are the compressed gas filter assemblies of Frantz U.S. Pat. Nos. 4,113,451 and 4,199,331. Both these assemblies have alternately filtering filter units each alternating between filtering and regenerating cycles and contain in the units' housings a particulate desiccant for maintaining a continuous output of filtered and dried gas, effect the alternate filtering and regenerating cycles by timer-controlled solenoid valves and are adapted to interrupt the cycling and force both units to pass gas when the pressure in the line downstream of the unit falls below a predetermined level. However, the housings of those units are separate, do not have common manifolds containing their inlet and outlet valves and require complex external piping connecting each unit's valves in series for ensuring that in a regenerating cycle the inlet and outlet valves close before opening and open after closing of the drain valve and enabling each unit in its filtering cycle to supply regenerating gas to the other unit. It is to an improvement on the assemblies of those Frantz patents that the present invention is particularly directed.

SUMMARY OF THE INVENTION

The primary object of the present invention is to provide an improved assembly for decontaminating compressed gas having alternately decontaminating twin towers each having inlet, outlet, drain and solenoid valves, wherein the inlet and drain valves of each tower are each directly connected to an outlet of the tower's solenoid valve, the inlet and drain valves are actuated respectively to close and open by actuating gas supplied through the solenoid valve, each tower is cycled by timer-controlled alternate energizing and deenergizing of its solenoid valve with consequent alternate supply and exhaust of actuating gas to and from the inlet and drain valves through the solenoid valve, and the inlet and drain valves are so constructed that gas supplied at the same pressure at the outlet of the solenoid valve exerts a greater force differential for closing the inlet valve than for opening the drain valve for causing the inlet valve to close before opening and open after closing of the drain valve.

Another object of the invention is to provide a gas decontaminating assembly according to the primary object, wherein the inlet valve is pneumatically closed and opened and the drain valve pneumatically opened and spring-closed, the actuating gas supplied through the solenoid valve for closing the inlet valve and opening the drain valve of each tower acts on larger heads of differential pistons in the valves, and the larger head of the piston of the inlet valve is of larger presented area than the smaller head of that piston and the larger head of the piston of the drain valve.

An additional object of the invention is to provide an assembly for decontaminating compressed gas having alternating decontaminating twin towers each having inlet, outlet, drain and solenoid valves and alternating between decontaminating and regenerating cycles, wherein top-connected upper parts of the towers are an integral upper part of the assembly, common inlet and outlet manifolds contain respectively the inlet and outlet valves of both towers, the solenoid valves are suspended from the outlet manifold, each tower in a decontaminating cycle supplies regenerating gas to the other tower in a regenerating cycle through a passage connecting outlet chambers in upper parts of the towers at a flow rate and pressure predetermined by the size of a restricted orifice in the passage, and the orifice is one of a plurality of orifices of different size each in one of a plurality of interchangeable members selectively insertable in the passage for varying the flow rate and pressure.

A further object of the invention is to provide a gas decontaminating assembly according to the primary object, wherein the assembly is connected for electric power to a source of direct current through a junction box mounted between the solenoid valves and containing a board-mounted solid state timer slidable into the box and having on an inner side contacts releasably received in fixed spring clip connectors electrically connected to the solenoid valves for therethrough controlling the alternate cycling of the towers, and connectors in the box are sealed against undetectable tampering.

Another object of the invention is to provide an assembly for decontaminating compressed gas according to the preceding object, wherein the towers are prevented from cycling and both forced to pass gas by a pressure sensitive switch responsive to gas pressure in the assembly for cutting off the supply of current to the solenoid valves when the pressure downstream of the assembly falls below a predetermined level.

A further object of the invention is to provide for a tower of an assembly for decontaminating compressed gas a canister-compactor assembly removably housed in the tower, whereof the canister is loadable outside the tower with a particulate desiccant and after loading with and compacting of the desiccant so holds the desiccant in compacted condition as to be shippable loaded without loss of compactness and without interfering with further automatic compacting by the oompactor when the canister-compactor assembly is housed in the tower.

Yet another object of the invention is to provide for a tower of a compressed gas decontaminating assembly a canister for containing a particulate desiccant which not only is shippable loaded but also mounts upstream of the desiccant an oil coalescer.

The foregoing and other objects and features of the invention will appear hereinafter in the detailed description, be particularly pointed out in the appended claims and be illustrated in the accompanying drawings in which:

FIGURE DESCRIPTION

DETAILED DESCRIPTION

Figure 1:
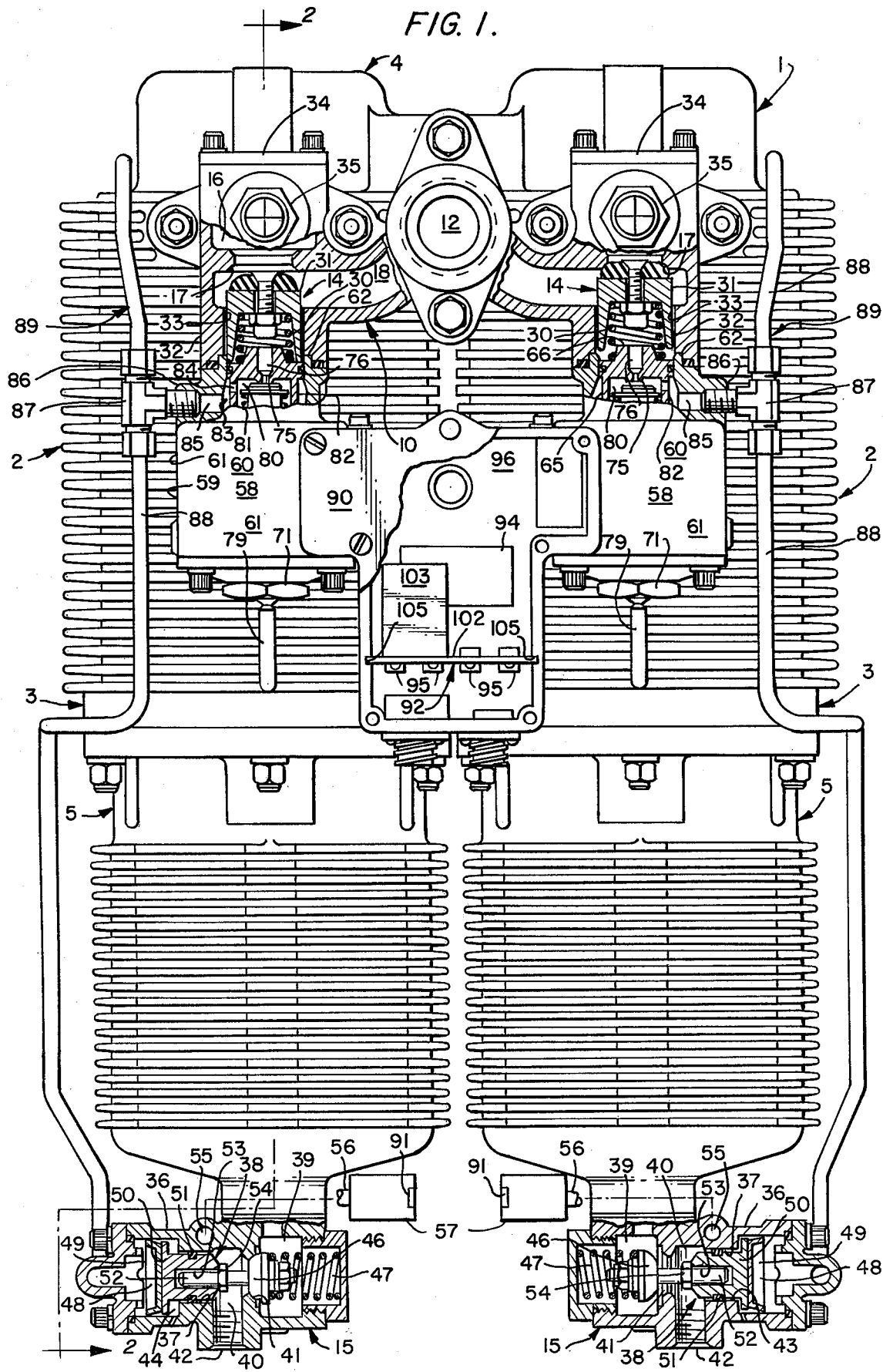
FIG. 1 is a front elevational view of a preferred embodiment of the twin tower compressed gas decontaminating assembly of the present invention, with portions broken away and shown in section to more clearly illustrate certain of the details of construction.
Figure 2:
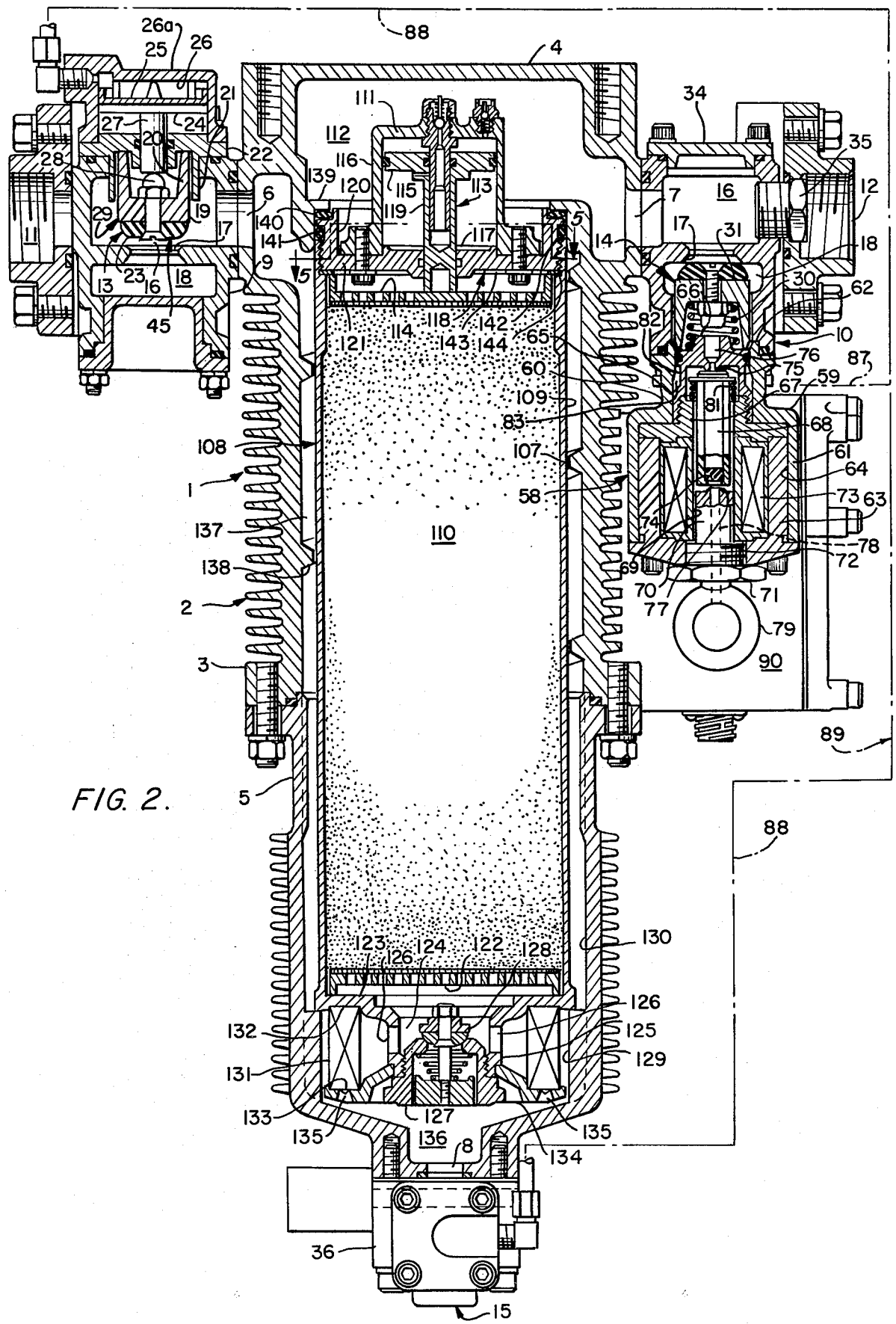
FIG. 2 is a vertical sectional view taken along lines 2—2 of FIG. 1.
Figure 3:
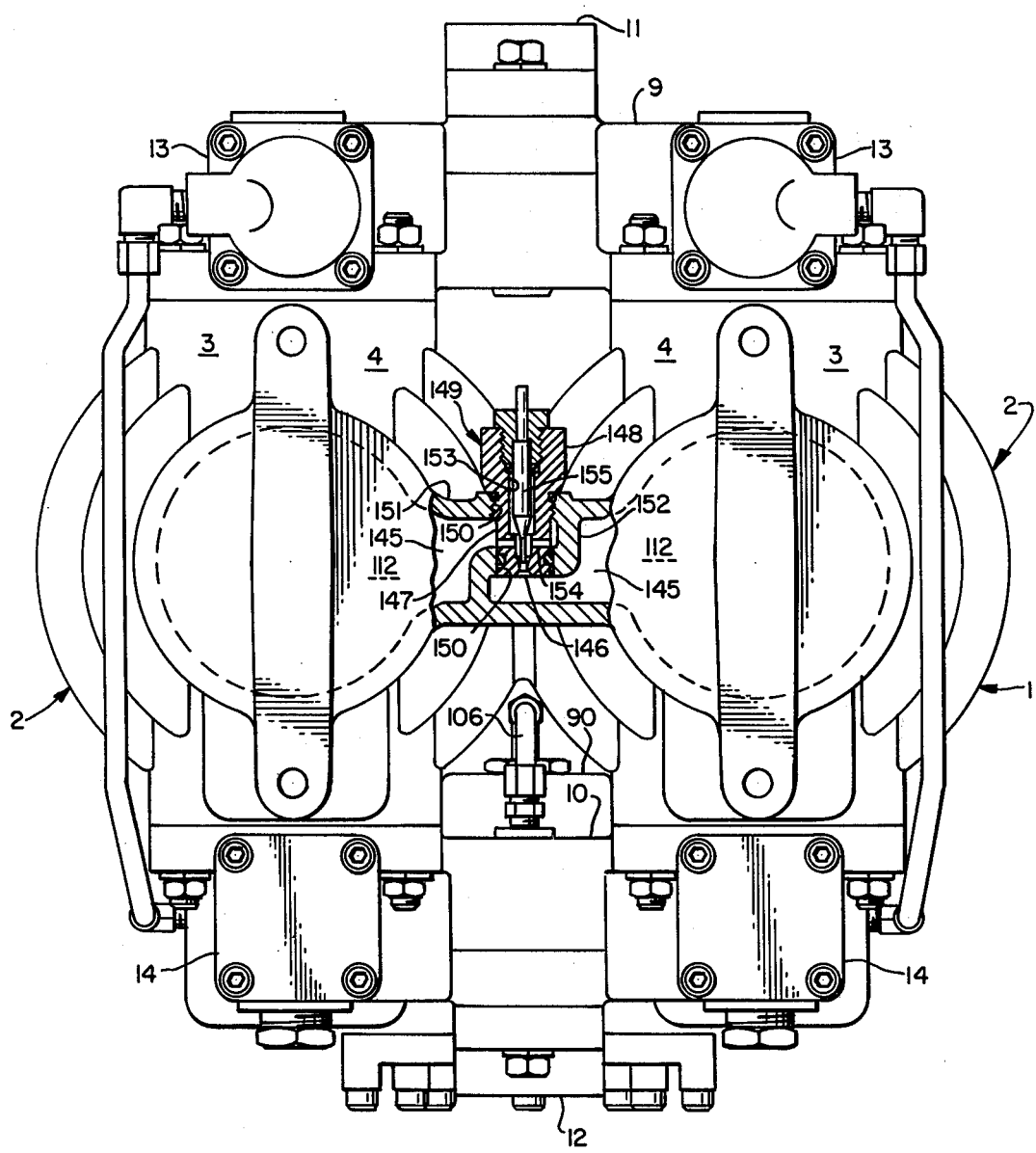
FIG. 3 is a plan view of the assembly of FIG. 1, with portions broken away and shown in section to more clearly illustrate certain of the details of construction.

Referring now in detail to the drawings in which like reference characters designate like parts, the improved twin tower or dual unit assembly of the present invention is designed to produce in normal operation a continuous output of decontaminated compressed air or other gas by alternately decontaminating contaminated gas in the towers each of which is alternatable between decontaminating and regenerating cycles. Particularly designed in the illustrated embodiment for decontaminating compressed air, the improved assembly is adapted in each tower in sequence to filter heavier particles from the incoming air by centrifugal filtering, coalesce and separate oil by a coalescer and adsorb moisture by a particulate adsorbent and in process cool the air before discharging compressed air that is both free of contaminants and cooled and available for use either as such or for operating devices downstream of the assembly that are operated by compressed air. Adapted for use, typically, in the compressed air system of a diesel locomotive for decontaminating compressed air, the improved assembly is adapted for use in industrial plants, as well, by selection of the adsorbent, for decontaminating other gases used in industrial processes.

In the preferred embodiment illustrated as exemplary of the invention, the improved assembly, designated as 1, is comprised of twin or a pair of duplicate or identical towers 2. Suitably cast of aluminium for its high heat conductivity, upper parts 3 of the towers 2 are cast as a unit as the assembly's integral or one-piece upper part 4. Also preferably aluminium castings, lower parts 5 of the towers 2 are separate and each removably attached, as by bolting, to the upper part 2 of one of the towers. Each tower 2 has inlet and outlet ports 6 and 7, respectively, conveniently on opposite sides of its upper part 3, and a drain port 8 at the bottom of its lower part 5. The towers 2 have common external inlet and outlet manifolds 9 and 10, respectively, each connecting the related of the inlet and outlet ports 6 and 7 to the related of the assembly's inlet and outlet 11 and 12, respectively, conveniently in the form of singleported flanged fittings centered laterally on and bolted to the manifolds. The several ports of each tower are valved, the inlet port 6 by a pneumatically opened and closed inlet valve 13, the outlet port 7 by a pneumatically opened, spring closed outlet valve 14 and the drain port 8 by a pneumatically closed, spring opened drain port 15, of which the inlet and outlet valves of both towers are mounted respectively in the inlet manifold 9 and outlet manifold 10.

The inlet and outlet manifolds 9 and 10 are alike in having adjacent opposite ends chambers or compartments 16, each opening inwardly onto the adjoining of the inlet and outlet ports 6 and 7 and downwardly onto one of a pair of laterally spaced valve seats 17, which in turn open downwardly onto an underlying conduit or passageway 18 in and extending longitudinally of the related manifold 9 or 10 and connecting the valve seats to each other and therebetween to the adjoining of the inlet and outlet 11 and 12. In the inlet manifold 9, each of the chambers 16 serves as a valve chamber for a skirted, downwardly closing, upwardly opening valve member or element 19 of the inlet valve 13 of one of the towers 2. With its skirt 20 received and somewhat loosely riding or fitting in a suitably cylindrical downwardly opening guideway 21 integral with and extending downwardly from a cover plate 22 sealing closing the upper end of the valve chamber 16, each valve member 19 has bolted to its lower end a preferably arcuately convex "TEFLON" washer or plug 23 alternately seatable from above in and unseatable from the adjoining or related valve seat 17, respectively for blocking from and passing to the inlet port 6 of the related tower 2 contaminated gas incoming from the inlet 11 through the conduit 18.

Opened or unseated by the pressure of incoming contaminated gas on the valve member 19, each of the inlet valves 13 is closable against the pressure of the incoming gas by the pressure of actuating gas on a piston 24 having a gasketed head 25 of larger presented area than the valve member 19, that rides or slides vertically in an actuating gas chamber 26 formed in a cap 26a surmounting and conveniently bolted through the cover plate 22 to the inlet manifold 9. The cover plate 22 is centrally apertured for passing and sealably engaging a stem 27 of the piston 24 that is projectable downwardly into the valve chamber 16 and contacts or abuts at its lower end a cap nut 28 fastening the plug 23 to the valve member 19. In constant contact through the stem 27 and cap nut 28 and with different areas presented to the pressures to which they are exposed, the valve member 19 and piston 24 together act as or constitute a differential piston 29 of which the skirt 20 fits loosely in the guideway 21 for bleeding between them any gas otherwise trapped within the skirt on opening of the valve 13.

As opposed to the inlet valves 13, the outlet valves 14 are mounted below the valve seat 17 in the outlet manifold 10 and are upwardly closing and downwardly opening, the former under force of return springs 30 and the latter under pressure of decontaminated gas passed to the adjoining of the chambers 16 in the outlet manifold through the outlet port 7 of the related tower 2. However, valve members or elements 31 of the outlet valves 14 preferably duplicate those 19 of the inlet valves 13 with skirts 32 loosely fitting in guideways 33, except that the skirts are depending or downstanding and surround or encircle the return springs 30 and the guideways are bottom openings in the outlet manifold 10 that open upwardly onto and extend downwardly from the manifold's conduit 18. Since the valve seats 17 in the outlet manifold 10 are bottom-closeable, the chambers 16 in the manifold above the seats are closed at the top, suitably by outwardly flat cover plates 34 and each conveniently has screwed into its outer end a humidity indicator 35 for visually indicating whether the related of the towers 2 is operating efficiently in its decontaminating cycle.

The preferred drain valve 15 of each of the towers 2 is mounted on or suspended from the bottom of the tower in direct fluid connection or communication with the drain port 8 but otherwise is similar to the drain valve of Frantz U.S. Pat. No. 4,113,451 in having a body or casing 36 capped at both ends and containing in a horizontally disposed axial bore 37 a differential piston 38. The bore 37, in sequence from one end, is divided axially into inlet and outlet chambers 39 and 40, respectively, straddling or on opposite sides of a valve seat 41 and opening, respectively, upwardly onto the drain port 8 and downwardly onto an exhaust port 42, and, beyond the outlet chamber, a guide chamber 43 and a pressure or actuating gas chamber 44. Contained in the inlet chamber 39, a smaller head 45 of the piston 38 on its seat-facing side carries or is fitted with a suitably arcuately convex "TEFLON" plug 46 seatable in the valve seat 41 and normally urged into seat-closing position by a return spring 47 acting between the head's opposite side and the adjoining capped end of the body 36. A larger head 48 of the piston 38 is contained and rides or slides in the pressure chamber 44 and carries or has fitted on its outer side facing the adjoining end of the body 36, a rubber or like cup gasket 49 sealingly engaging the side of the chamber and has centered on and extending inwardly from its opposite side a shank 50 riding or sliding in the guide chamber 43 and sealed thereagainst, suitably by an O-ring 51. For connecting the heads 45 and 48, the smaller head has a stem 52 extending through the valve seat 41 and slidable into an axial aperture 53 in the shank 50, the stem preferably being threaded for threadedly receiving a nut 54 engaging the inner end of the shank for predeterminedly fixing the spacing of the heads. Closed normally or during a decontaminating cycle of the related tower 2 by the pressure of the spring 47 on the smaller head 45, the drain valve 15 is opened during the tower's regenerating or drain cycle by the pressure of actuating gas on the cup-gasketed larger head 48. The body 36 of the drain valve 15, suitably above the guide chamber 43, has a transverse opening 55 for receiving a heating rod or element 56 of an electric heater 57 thermostatically controlled for preventing freezing of the valve on sensing near-freezing weather.

Each of the towers 2 has suspended from the outlet manifold 10 below its outlet valve 14 a solenoid or solenoid-actuated valve 58. As illustrated, each of the preferred solenoid valves has a hollow, open-ended outer shell 59 narrower externally and internally over its upper part 60 than its lower part 61 and removably attached, as by bolting, to the bottom of the outlet manifold, with its upper end 62 suitably gasketed for sealingly engaging or abutting against the manifold about and open internally to the bottom-opening guideway 33 for the valve member 31 of the related outlet valve 14. Removably seating in and slidable from below as a unit into and bolted to and closing the bottom of the outer shell 59, is a composite inner housing or casing 63. Conforming substantially in external cylindrical contour to the stepped, two-diameter cylindrical interior 64 of the shell 59, the inner housing 63 has an upper or cap part 65 seating in the upper part 60 of the shell and topped by an integral coaxial central boss 66 upstanding or extending upwardly above the shell into the guideway 33 laterally within the skirt 32 of the related outlet valve's valve member 31. The housing 63 contains in a central vertically disposed valve chamber 67 a vertically reciprocable magnetic plunger or armature 68 and in a coaxial downward extension 69 of the valve chamber, a stationary magnetic coil pole or head 70, the latter fixed to or rigid with and upstanding from a conveniently hex-headed threaded plug 71 screwed into and closing a central opening 72 in the bottom of the housing. Also contained in the housing 63 and surrounding the lower portion of the valve chamber 68 and its downward extension 69, is a preferably epoxy-encapsulated solenoid coil 73.

Similar to the plungers of Frantz U.S. Pat. No. 2,887,126 and shown in FIG. 13 of Frantz U.S. Pat. No. 4,113,345 the preferred plunger 68 of the solenoid valve 58 of each tower 2 is generally square in cross-section with rounded corners slidably contacting the side of the valve chamber 67 for both guiding the plunger in its reciprocable movement and enabling gas to flow past the plunger through the valve chamber. As do those of the above Frantz patents, the plunger 68 has in opposite ends rubber plugs 74 for alternately seating on and closing suitably frustoconical raised valve seats at opposite ends of the valve chamber, one, an upper or inlet seat 75 at the upper end of the valve chamber connecting to the guideway 33 through a coaxial inlet passage 76 extending upwardly therefrom through the boss 66. The other seat is a lower or exhaust seat 77 formed on the upper end of the coil pole 70 and connected to atmosphere through an exhaust passage 78 extending downwardly therefrom through the coil pole and plug 71 and the intervening portion of a ring 79 fixed to or rigid with and depending from the plug and providing a convenient handle for inserting and removing the inner housing 63 and its contents into and from the outer shell 59.

The upper part 65 of the inner housing 63 contains in a cavity 80 formed as a radially enlarged upper end portion of the valve chamber 67, a spring 81 acting upwardly on the plunger 68 for normally closing the upper valve seat 75. In the vicinity of the cavity 80, the side wall 82 of the upper part 65 is annularly grooved and relatively thin for forming between the housing and the shell 59 an annular outlet chamber 83 surrounding and connecting or communicating inwardly with the cavity through a radial duct 84 in the side wall and outwardly with an outlet port 85 of the solenoid valve 58 that opens radially through the side wall 86 of the shell's upper part 60. In turn, through a tee 87, the outlet port 85 is connected by branches 88 of external piping 89 separately and directly to the actuating gas chambers 26 and 44 of the inlet valve 13 and drain valve 15, respectively, for simultaneously or concurrently supplying actuating gas from the solenoid valve for closing the inlet valve and opening the drain valve.

While the towers 2 alternate in their decontaminating cycles with corresponding alternate opening of their outlet valves 14, during the operation of the assembly 1, the conduit 18 in the common outlet manifold 10, since connectable to the valve seats 17 of both outlet valves, is constantly or continuously supplied with decontaminating compressed gas through one or the other of the valve seats. With the skirts 32 of the valve members 31 of both outlet valves 14 loosely seating in their guideways 33, compressed gas from the conduit is free at all times to pass between the skirts and guideways of both valves and, through the inlet passages 76, make available at the upper seats 75 of both solenoid valves 58 a constant supply of decontaminated actuating gas. Consequently, on energizing of the coil 73 of either of the solenoid valves 58, its plunger 68 is unseated from its upper or inlet valve seat 75 and seated against the lower or exhaust valve seat 77, at which time actuating gas is substantially simultaneously supplied from the outlet port 85 through the tee 87 and both branches 88 of the piping 89, directly and separately to the actuating gas or pressure chambers 26 and 44 of the related inlet and drain valves 13 and 15 for closing the inlet valve and opening the drain valve. Conversely, on deenergizing of the coil 73 of either solenoid valve 58, its plunger 68 is shifted by the return spring 81 to close the upper valve seat 75 and open the lower seat 77, at which time actuating gas previously supplied to the tower's inlet and drain valves 13 and 15 is exhausted, bled or drained from their actuating gas chambers 26 and 44 back through the branches 88 of the piping 89 to the solenoid valve's outlet port 85 and thence through the valve chamber 67 past the plunger to the lower or exhaust seat 77 for exhausting to atmosphere through the exhaust passage 78.

Despite the connection of only its inlet and drain valves 13 and 15 to its solenoid valve 58 for alternate supply and exhaust of actuating gas, each tower 2 of the illustrated embodiment substantially inhibits loss through the drain valve of the compressed gas being decontaminated by providing a greater force differential for closing the inlet valve than for opening the drain valve, as by having a ratio on the order of about 1 to 0.39 of the presented area of the inlet valve's larger head 25 to the area presented by each of the inlet valve's valve member or smaller head 19 and the larger head 49 of the differential piston 38 of the drain valve. Since the pressures of the contaminated compressed gas received at the inlet 11 of the assembly 1 from a compressor or other suitable source (not shown) and the decontaminated gas available as actuating gas at the inlet seat 75 of the solenoid valve 58 are substantially the same and the solenoid valve, when energized, simultaneously supplies actuating gas at the same pressure at its outlet port 85 to both the inlet and drain valves 13 and 15, the effect of the direct connection of each of the inlet and drain valves to the solenoid valve and the greater force differential for closing the inlet valve than for opening the drain valve and consequent greater resistance of the inlet valve to opening than of the drain to closing in the succeeding regenerating cycle, in the cycling of each tower between decontaminating and regenerating cycles, is to cause its inlet valve to close before opening and open after closing of its drain valve.

With both the solenoid valves 58 and heaters 57 electrically operated, for connection to a suitable electric power or current source, the assembly 1 has a junction box 90 conveniently mounted on and between the lower parts 61 of the shells 59 of the solenoid valves 58. Energized independently of the solenoid valves 58 on exposure to a temperature approaching freezing, suitably 35° F. (1.67° C.), the heaters 57 have exposed thermostats 91 separately connected through the junction box 90 to the power source. For controlling energizing of the solenoid valves 58, the junction box 90 contains an electrical timer 92, a pressure sensitive switch 93, a set of junction blocks 94 and a separate set of spring clip connectors 95, which, except for the timer, suitably are fixed to or stationarily mounted on the junction box's rear wall 96.

Preferably both direct and polarized, current is supplied to the assembly 1 from a suitable source, such as a battery or generator (not shown), by a supply cable 97 containing positive and negative leads connected at one end to the corresponding terminals of the power source and at the other end by a plug-in connector 98 to a receptacle or junction 99 in the back of the junction box, with the connector so pronged and receptacle so apertured as to prevent misconnection. For their independent operation, the heaters 57 are connected directly to positive and negative terminals of the receptacle 99. For operating the solenoid valves 58, a lead from one of the terminals of the receptacle 99, usually the positive 100, runs to the pressure switch 93 and connects that switch in series with the timer 92 through one of the junction blocks 94 and spring connectors 95. In turn, the timer 92 is separately connected to an end of each of the coils 71 of the solenoid valves 58, opposite ends of which if the lead is positive, are suitably grounded, as by being connected to the other, in this case, negative terminal 101 of the receptacle 99.

Figure 6:
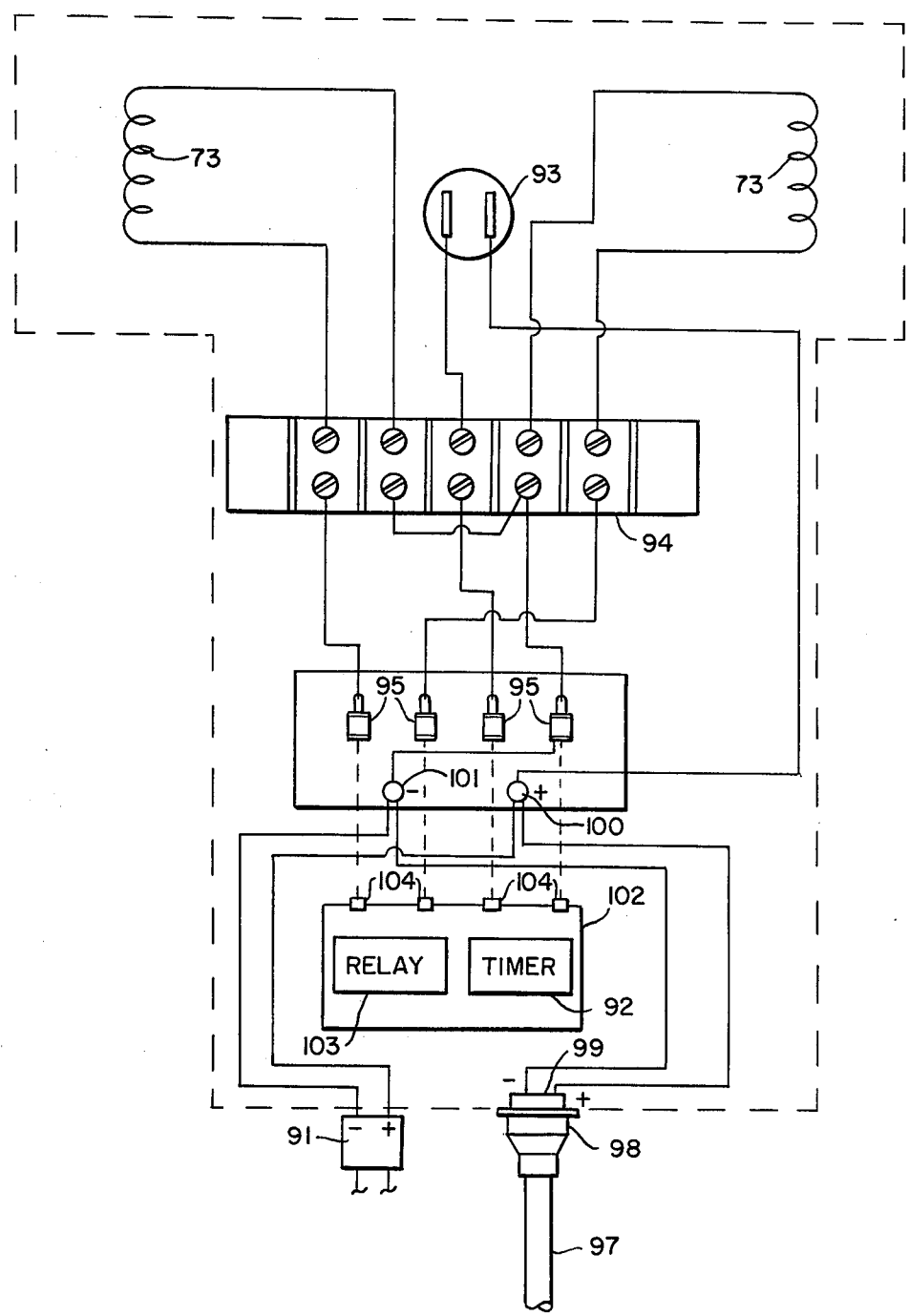
FIG. 6 is a wiring diagram of the electrical circuit for operating the solenoid valves and drain valve heaters of the assembly of FIG. 1.

Indicated by a labeled box in FIG. 6, the timer 92 conveniently is a chip-timed solid state printed circuit, such as disclosed in Frantz et al U.S. Pat. No. 4,336,821 for timing a single solenoid valve. Mounted on a board 102, the timer 92 is suitably connected to the solenoid coils 73 through a relay 103 also mounted on the board. Settable or adjustable for alternately energizing the solenoid valves 58 in cycles of predetermined duration so long as it receives current supplied to the junction box 90 through the cable 97, the preferred timer 92 has as contacts suitably axially slotted cylindrical contacts 104 pressed in laterally spaced relation onto the inner side of the board 102. Of a width and thickness for slidably fitting at ends into horizontally disposed guide slots 105 in opposite sides of the junction box 90, the board, when slid sideways into the guide slots into the junction box, has each of its contacts 104 aligned with and adapted to be yieldably or resiliently clamped in one of the spring clip connectors 95 for both connecting the timer 92 between the pressure switch 93 and the solenoid valves 58 and yieldably securing or holding the timer in the junction box.

Normally closed for electrically connecting the timer 92 to a terminal of the receptacle 99, the pressure switch 93 is pneumatically opened and spring closed and responsive in opening and closing to pressure of decontaminated gas received internally from the conduit 18 in the outlet manifold 10 through piping or tubing 106 connected to the conduit between the outlet valves 14. Since the conduit 18 receives gas through one or the other of the valve seats 17 in the outlet manifold 10 whenever either of the towers 2 is in a decontaminating cycle and is open to downstream line pressure beyond the outlet 12, the decontaminated gas in the conduit is always at downstream line pressure. Consequently, by setting the pressure switch 93 to open at a predetermined minimum pressure below which alternate cycling of the towers 2 cannot supply a sufficient output of decontaminated gas for operating such essential devices as air brakes, as during pumpup of a compressor supplying contaminated gas to the assembly 1 or loss of line pressure through a break in a line of the compressed gas system in which the assembly 1 is installed, the pressure switch will open and prevent cycling of the towers by cutting off the supply of current to the timer 92. Since the solenoid valves 58 are normally spring-closed, whenever current to them is cut off, the towers 2 will be in their decontaminating mode and decontaminated gas will be supplied by both to the outlet 12 until line pressure reaches or is restored to a pressure above the predetermined minimum at which the pressure switch 93 has been set to open.

Figure 4:
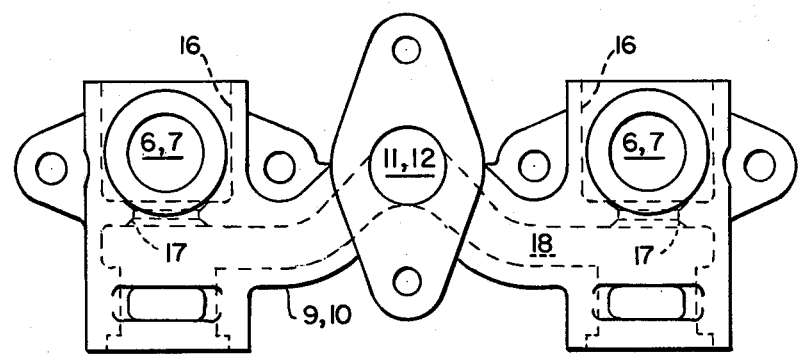
FIG. 4 is a side elevational view of one of the inlet and outlet manifolds removed from the assembly and showing the structure common to both manifolds.
Figure 5:
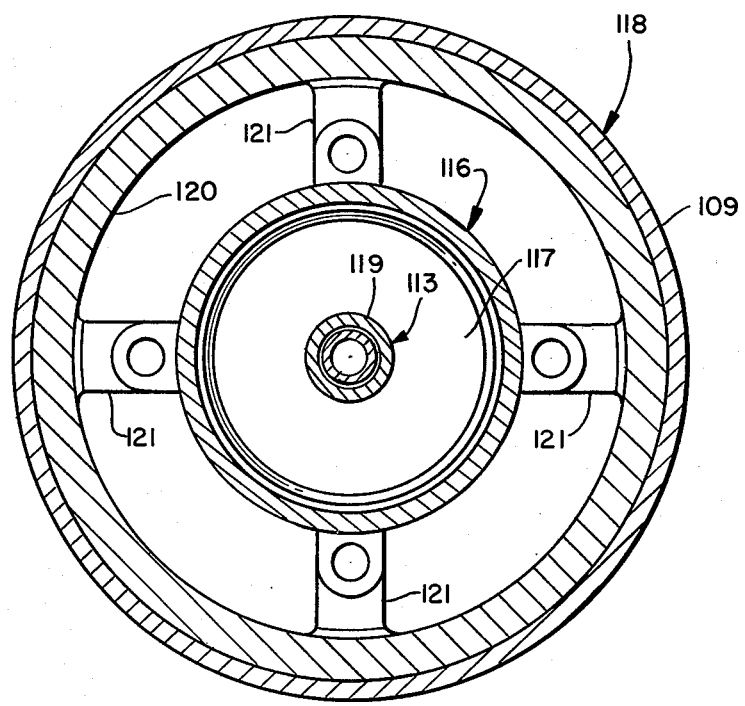
FIG. 5 is a fragmentary horizontal sectional view taken along lines 5—5 of FIG. 2.

With its upper and lower parts 3 and 5 externally finned for efficient heat dissipation and removably attached to each other, each of the towers 2 has a central or axial bore 107 removably housing a canister-compactor assembly 108. Insertable in and removably from the bore 107 by detaching the lower part 5, the canister-compactor assembly 108, except for the lack of central tubing, is generally similar to that of FIGS. 4–6 of Frantz U.S. Pat. No. 4,336,042 in containing in a canister 109 a preferably molecular sieve particulate desiccant 110 and having screwed into the top of the canister a compactor 111 pneumatically actuated by decontaminated compressed gas received or contained, during the tower's decontaminating cycle, in an outlet chamber 112 above or downstream of the bore 107. For applying a compacting force to the desiccant 110, the compactor 111 has a piston 113 acting downwardly on a foraminous or perforate floating follower 114 in the canister 107 above the desiccant. In the illustrated compactor 111, a head 115 of the piston 113 is contained in a casing 116 closed at the bottom by a hub 117 of a base 118 through which a stem 119 of the piston extends. A rim 120 of the base, screwed or threaded into the open top of the canister 109, is connected to the hub 117 by circumferentially spaced radial ribs 121 to which the casing 116 is bolted and between which decontaminated gas passes to the outlet chamber 112.

Contained in the canister 109 at the top by the floating follower 114, the desiccant or desiccant bed 110 is contained at the bottom by a similarly foraminous or perforate stationary closure member 122 resting or seating on and supported by a radially instanding or inturned annular flange or ledge 123 surrounding or encircling the upper end of an open-ended inlet passage 124 opening upwardly through the bottom closure member onto the desiccant bed. Formed in an annular boss 125 coaxial with and narrower than the canister 109 and fixed to or rigid with and depending or extending downwardly from the annular flange 123, the inlet passage 124 opens at the side through radial ports 126 and normally is closed at the bottom by a plug 127 screwed into the bottom of the boss and containing a bypass valve 128 for opening or bypassing the radial ports when the pressure of the gas in the lower part 5 of the tower exceeds a predetermined maximum. The canister-compactor assembly 108 is supported in the bore 107 by circumferentially spaced, vertically disposed ribs 129 fixed to or integral with and instanding radially from the tower's side wall 130 adjacent the bottom of its lower part 5.

The preferred canister 109 not only forms with the compactor 111, the canister-compactor assembly 108 but also preferably mounts upstream or below the desiccant an oil coalescer unit 131, preferably in the form of a knitted wire mesh cylindrical annulus or ring seating in vertically spaced and aligned upper and lower annular seats 132 and 133, respectively, of which the upper is in the underside of the flange 123 and the lower in the upper side of a centrally apertured annular skirt or flange 134 slidably onto and extending outwardly from the lower end of the boss 125 and removably held thereon by the plug 127. A plurality of circumferentially spaced drain holes 135 interrupt and open downwardly from the lower seat 133 for enabling oil coalesced in the coalescer unit 131 to drain by gravity through the holes into a sump 136 in the bottom of the tower 2 for discharge through the drain port 8 on opening of the drain valve 15 in a regenerating cycle of the tower.

Contaminated compressed gas entering either of the towers 2 through the inlet port 6 flows downwardly through a passage 137 between the tower's side wall 130 and the canister 109, initially for centrifugal filtering of relatively heavy entrained particles with a swirling or cyclonic motion imparted by helical inner ribbing 138 in the upper part 3, and continues its downward flow until reaching the level of the coalescer unit 131. At that level the gas is changed in direction for flow laterally through the coalescer unit 131 and the radial ports 126 into the inlet passage 124, where it again changes direction and flows upwardly through the desiccant bed 110 and, as then decontaminated gas, into the outlet chamber 112 for discharge through the tower's outlet port 7 and outlet manifold 10 to the assembly's outlet 12. For blocking incoming contaminated gas from bypassing the canister-compactor assembly 109 and flowing directly from the inlet port 6 to the outlet chamber 112, there is provided in the tower 2 at the upper end of the bore 107 a radially instanding annular abutment or shoulder 139, against the underside of which the rim 120 of the compactor 111 of the canister-compactor assembly is cushioned by an interposed, suitably rubber, cushioning gasket 140. However, absent means for displacing the canister-compactor assembly 108 upwardly in the bore 107 from its seat on the ribs 112 and thereby compressing the cushioning gasket 140, the gasket is not an assured seal. For effectively sealing against bypassing of incoming gas, the rim 120 of the compactor 111 therefore peripherally carries or mounts an O-ring 141 sealingly engaging the confronting side 142 of the bore 107.

The canister 109, when removed from one of the towers, is loadable through the top with the particulate desiccant 110 by unscrewing the compactor 111 and removing the floating follower 114. Whenever requiring loading, the canister 109, removed from the assembly 1 at a suitable site, is loaded through the top with a predetermined charge of the particulate desiccant 110 and the desiccant is compacted, suitably by inserting and applying a compacting force to the floating follower 114. With the desiccant compacted and the floating follower 114 then in its initial compacting position, the floating follower is locked or held against upward movement in that position by a snap ring 143 seating in a groove 144 in the side of the canister 109 and engaging the upper end of the floating follower. Positioned between the floating follower 114 and the compactor 111, when the latter is screwed in place, the snap ring 143, while locking the floating follower against upward movement, does not interfere with its downward movement under force of the compactor 111 when in service compacting is needed. With the snap ring 143 in place, it therefore is possible to ship the canister loaded from the loading site to any destination and by maintaining the compactness of the desiccant, inhibit its deterioration before the canister-compactor assembly 108 is installed in bore 107 of one of the towers 2. Also, it is not necessary that the canister 109 be shipped with the compactor 111 in place. Thus, if more convenient, when the canister-compactor assembly 108 is removed from a tower 2 for reloading, the compactor 111 and coalescer unit 131 can both be removed and only the canister 109 need be shipped to the loading site.

The outlet chambers 112 of the towers 2, which first receive the decontaminated compressed gas passed from the desiccant beds 110, not only are way stations in the passage of the decontaminated product gas to the assembly's outlet 12, but each, in its tower's decontaminating cycle, also is the source of the regenerating gas for the other tower in the latter's regenerating cycle. For that purpose, the outlet chambers 112 are directly connected by a passage 145, conveniently cast with the chambers in the assembly's one-piece common upper part 4, through which regenerating gas flows from either outlet chamber to the other at a flow rate and pressure predetermined as suitable for regenerating in the particular installation, by passing the gas through the same or a common restricted orifice 146 in the passage suitably positioned substantially midway between the outlet chambers. For enabling the pressure and flow rate of the gas passed through the passage 145 to be adjusted or regulated to suit the intended installation, the restricted orifice 146 is one of a plurality of orifices of different size, each formed as an axial port in an inner end of a reduced neck portion 147 of a body 148 of one of a plurality of members or inserts 149 interchangeably insertable or screwable into a socket 150 extending through the rear wall 151 of and a suitably central web 152 in and interrupting the passage. In each of the interchangeable members 149, the restricted orifice 146 opens outwardly onto the passage 145 at one side of the web 152 and inwardly onto a central bore 153 of the member, which in turn opens through radial ways 154 onto the passage at the other side of the web. A cleanout plunger 155 reciprocable in the bore 153 and manually projectable into the orifice 146, enables the latter to be cleaned in case of blockage.

In the operation of the assembly 1, the towers 2 under control of the timer 92, normally alternately receive and decontaminate contaminated compressed gas supplied to the assembly's inlet 11 from a compressor or other source (not shown). The timer 92 alternately energizing the solenoid valves 58 for supplying when energized and exhausting when deenergized actuating gas to and from the related inlet and drain valves 13 and 15, the tower 2 of the deenergized solenoid valve is in a decontaminating cycle with its inlet valve and outlet valve 14 open and its drain valve closed, while the tower of the energized solenoid is in its regenerating cycle with its inlet and outlet valves closed and drain valve open. Thus, contaminated gas received at the inlet 11 at a given time will pass through whichever tower is in its regenerating cycle and be discharged therefrom to the outlet 12 as decontaminated gas, and will pass through both towers only when the pressure switch 93 cuts off the supply of current to the timer 92.

With the inlet and drain valves 13 and 15 of each tower 2 directly connected to the outlet port 85 of its solenoid valve 58, actuating gas is concurrently supplied to and exhausted from the inlet and drain valves through the solenoid valve, respectively on opening and closing of the solenoid valve's upper valve seat 75. Due to the greater force differential applied by the actuating gas in closing the inlet valve 13 than in opening the drain valve 15 and the attendant greater resistance of the inlet valve to opening than the drain valve to closing, the inlet valve closes before opening and opens after closing of the drain valve.

Each of the towers 2 in a decontaminating cycle supplies decontaminated regenerating gas from its outlet chamber 112 to the outlet chamber of the other tower in the latter's regenerating cycle through the passage 145 connecting their outlet chambers at a flow rate and reduced pressure predetermined by the size of the restricted orifice 146 inserted in the passage. In the tower in its regenerating cycle, the regenerating gas flows reversely downward through the desiccant 110 and the coalescer unit 131 suspended from the canister 109, to the sump 136 in the bottom of the tower for discharge therefrom through the then open drain valve 15. Regenerating the desiccant 110, the reverse-flowing low pressure regenerating gas also assists gravity drainage in purging the coalescer unit 123 of collected oil, while not interferring with discharge from the sump of contaminants collected therein during a preceding decontaminating cycle under the pressure of gas remaining in the tower at the beginning of its regenerating cycle.

From the above detailed description it will be apparent that there has been provided an improved twin tower assembly for decontaminating compressed gas in which alternate cycling of the towers results from alternate energizing of their solenoid valves under timer control and direct connection of the inlet and drain valves of each tower to its solenoid valve for supply and exhaust of actuating gas through the solenoid valve, and each tower in a decontaminating cycle supplies regenerating gas to the other tower at a flow rate and pressure predetermined by a restricted orifice selected from a plurality of orifices of different size interchangeably insertable into a passage connecting outlet chambers of the towers. It should be understood that the described and disclosed embodiment is merely exemplary of the invention and that all modifications are intended to be included that do not depart from the spirit of the invention and the scope of the appended claims.

Having now described my invention, I claim:

1. An assembly for decontaminating compressed gas, comprising twin towers each containing a particulate desiccant and having inlet, outlet, drain and solenoid valves, said inlet and drain valves of each tower each being directly connected to said solenoid valve thereof and actuated respectively to close and open by actuating gas alternately received from and exhausted through said solenoid valve, said assembly including timer means for alternately actuating said solenoid valves and therethrough said inlet and drain valves for causing said towers each to alternate between decontaminating and regenerating cycles and together normally to alternately decontaminate contaminated compressed gas received by said assembly for supplying at an outlet of said assembly a continuous output of decontaminated compressed gas.

2. An assembly according to claim 1, wherein in each tower the inlet valve is pneumatically closed and opened and the drain valve is pneumatically opened and spring closed, and including valve members in said valves so relatively constructed and arranged that actuating gas supplied at the same pressure at an outlet of the solenoid valve exerts a greater force differential for closing the inlet valve than for opening the drain valve and thereby causes the inlet valve to close before opening and open after closing of the drain valve.

3. An assembly according to claim 2, wherein the valve member in each of the inlet and drain valves of each tower is a differential piston presenting a larger head to actuating gas from the solenoid valve and the presented area ratio of the larger head of the inlet valve piston to a smaller head of said piston and the larger head of the drain valve piston is on the order of about 1 to 0.39 for producing a greater force differential for closing the inlet valve than for opening the drain valve and a greater resistance to opening of the inlet valve than to closing of the drain valve.

4. An assembly according to claim 1, wherein each solenoid valve includes a plunger reciprocable in a valve chamber for alternately opening inlet and outlet valve seats at opposite ends of said chamber, and means so connecting inlet valve seats of both solenoid valves to outlet ports of both towers as to make available at both inlet valve seats a continuous supply of decontaminated actuating gas from whichever tower is in a decontaminating cycle.

5. An assembly according to claim 1, wherein each tower has removably connected upper and lower parts, said upper parts are parts of a one-piece upper part of the assembly, the assembly includes inlet and outlet manifolds common to both towers, and the inlet and outlet valves of both towers are mounted respectively in said inlet and outlet manifolds.

6. An assembly according to claim 5, including in the outlet manifold a passage connecting valve seats of both outlet valves and constantly supplied with decontaminated compressed gas through one or the other of said outlet valve seats from whichever tower is in a regenerating cycle, said passage connecting about valve members of the outlet valves to the inlet valve seats of the solenoid valves for constantly making available decontaminated gas as actuating gas at said inlet valve seats.

7. An assembly according to claim 1, including an electrical circuit connected to an electric power source, and the timer means is in said circuit in advance of and separately connected to coils of the solenoid valves for alternately energizing said coils and correspondingly alternating supply of actuating gas to the inlet and drain valves of the two towers.

8. An assembly according to claim 7, including a pressure sensitive switch connected in the control circuit in advance of and in series with the timer means and exposed to the pressure of decontaminated gas produced by the assembly for preventing cycling of the towers and forcing both to pass decontaminated gas by cutting off the supply of current from the power source to the timer means when said pressure falls to a predetermined minimum.

9. An assembly according to claim 8 wherein the electrical circuit is a polarized circuit including for each drain valve a thermostatically controlled electric heater having a heating element seated in a body of the drain valve and connected to the power source separately from the solenoid valves.

10. An assembly according to claim 7, including a junction box mounted between the solenoid valves and housing the electrical circuit and the timer means is a removable boardmounted solid state circuit slidably insertable into the junction box through guide slots in sides thereof and having on an inner side laterally spaced terminals each aligned with and seatable in one of a plurality of spring clip contacts of the circuit stationarily mounted on a back of the box.

11. An assembly according to claim 1, including a canister-compactor assembly insertable as a unit into a bore of each of the towers and supported therein on rib means fixed to and instanding from a side wall of the tower, an annular shoulder radially instanding from said tower side wall at an upper end of said bore, a cushioning gasket interposed between an underside of said shoulder and a confronting surface on a compactor of said canister-compactor assembly, and a peripheral O-ring on said compactor and sealingly engaging a side of said bore for preventing contaminated gas received by said first-named assembly from bypassing a desiccant contained in a canister of said canister-compactor assembly.

12. An assembly according to claim 1, including a canister removably seated in a central vertical bore of each of the towers and containing a particulate desiccant, an outlet chamber in an upper part of each tower and opening downwardly onto said bore thereof for receiving decontaminated compressed gas passed through said canister, a passage connecting said chambers for passing decontaminated regenerating gas from said outlet chamber of either tower during a decontaminating cycle thereof to the outlet chamber of the other tower during a regenerating cycle thereof, and a restricted orifice in said passage between said chambers for predetermining by the size thereof the rate of flow and pressure of regenerating gas passed between said outlet chambers.

13. An assembly according to claim 12, wherein the restricted orifice is one of a plurality of orifices of different size each formed in one of a plurality of interchangeable members selectively insertable in said passage through a side thereof and extending through a web in and interrupting said passage.

14. An assembly according to claim 13 wherein the restricted orifice opens outwardly onto the passage on one side of said web and inwardly onto an axial bore in said member opening through radial ports onto said passage at the other side of said web.

15. An assembly according to claim 14 including a cleanout plunger reciprocable in said bore and manually projectable into said orifice.

16. The combination with a compressed gas decontaminating assembly having a tower alternating between filtering and regenerating cycles, of a canister-compactor assembly insertable and removable as a unit in and from said tower, said canister-compactor assembly comprising an open-topped canister for containing and loadable through the top with a predetermined charge of particulate desiccant, said canister before loading containing a stationarily mounted foraminous bottom closure member and after loading having inserted through the top a foraminous floating follower member between which and said bottom closure member said desiccant is contained, said floating follower member after insertion having applied thereto a downward force for compacting said desiccant, a snap ring insertable through the top into a groove in a side of said canister for locking said floating follower against upward movement in desiccant-compacting position without interfering with subsequent downward movement thereof, and a pneumatic compactor releasably fittable into the top of the canister above said snap ring and automatically operable after insertion as a unit with the canister in the tower for maintaining compactness of said desiccant in service by applying a downward compacting force thereto through said floating follower member.

17. A canister-compactor assembly according to claim 16, including an oil coalescer unit removably suspended from the canister and insertable as a unit therewith and the compactor into the tower.

18. The combination with a compressed gas decontaminating assembly having a tower alternating between filtering and regenerating cycles, of a canister-compactor assembly insertable and removable as a unit in and from said tower, said canister-compactor assembly comprising an open-topped canister top-loadable with and containing a particulate desiccant, foraminous bottom closure and upper floating follower members in said canister and therebetween containing said desiccant, an annular flange instanding radially from a side and partly closing a bottom of said canister and supporting said bottom closure member, a boss coaxial and rigid with and downstanding from said flange, an open-ended inlet passage centered on and extending vertically through said boss and opening upwardly onto said bottom closure member, plug means removably closing a bottom of said passage and mounting a bypass valve, an annular skirt slidable on and outstanding laterally from a lower end of said boss and removably held thereon by said plug means, an annular knitted wire mesh coalescer unit encircling and spaced outwardly from said boss and seated in confronting vertically spaced upper and lower seats respectively in said flange and skirt, radial ports in said boss opening from said passage outwardly onto said coalescer unit, and a plurality of circumferentially spaced drain holes interrupting and opening downwardly from said lower seat for draining oil from said coalescer unit.

* * * * *